United States Patent Office 3,133,940
Patented May 19, 1964

3,133,940
PROCESS FOR THE SEPARATION OF Δ$^{1,4}$-3-KETO STEROID COMPOUNDS FROM MIXTURES THEREOF WITH OTHER 3-KETO STEROIDS
John Francis Oughton and Leslie Stephenson, London, England, assignors to Glaxo Group Limited, Greenford, England, a British company
No Drawing. Filed Apr. 16, 1956, Ser. No. 578,171
Claims priority, application Great Britain Apr. 10, 1956
6 Claims. (Cl. 260—397.45)

This invention is concerned with improvements in or relating to the preparation of Δ$^{1,4}$-3-keto-steroids, and more particularly, but not exclusively, the preparation of 1:2-dehydrocortisone esters, 1:2-dehydrocortisol esters and allied compounds.

The introduction of a double bond into the 1:2-position of cortisone and cortisol (and their esters) has been shown to enhance the therapeutic activity of these compounds. Following this discovery intensive research has been conducted into the preparation of analogues of cortisone and other steroids having like therapeutic activity and having a double bond in the 1:2-position. Apart from cortisone and its analogues, other Δ$^{1,4}$-3-keto-steroids are of interest.

Various methods for the synthesis of Δ$^{1,4}$-3-keto-steroids have been suggested. In one such method it has been proposed to dehydrobrominate 2:4-dibromo-3-keto-steroids with a suitable dehydrobrominating agent, for example, a tertiary base such as collidine. A successful method of this type would be of great value especially in the allo series since 2:4-dibromo-3-keto-5α-steroids can be readily prepared by methods used in the synthesis of cortisone. However it has been found that such a dehydrobromination step always leads to a mixture of products containing the desired Δ$^{1,4}$-3-keto-steroid in greater or lesser amount together with Δ$^1$-, Δ$^4$- and/or Δ$^{4,6}$-3-keto-steroids as impurities according to the success of the dehydrobromination. We have made attempts to separate such mixtures using conventional techniques such as chromatography and fractional crystallisation but did not achieve any measure of success. Furthermore, other methods for the preparation of Δ$^{1,4}$-3-keto-steroids are likely to give rise to mixtures containing such steroids in admixture with Δ$^1$-, Δ$^4$-, and/or Δ$^{4,6}$-3-keto-steroids.

We have now found that whereas saturated 3-keto-steroids Δ$^1$- and Δ$^4$-3-keto-steroids and also Δ$^{4,6}$-3-keto-steroids will form derivatives with Girard reagents T or P, Δ$^{1,4}$-3-keto-steroids on the other hand will not form such derivatives provided that they do not contain any reactive carbonyl group other than the 3-keto group. By the term "reactive carbonyl group" we mean carbonyl groups which will react under favourable conditions to form derivatives with Girard reagents T or P. It is well known, for example, that an 11-keto group in steroids is unreactive to Girard reagents and so also is a 20-keto group if it is subjected to steric hindrance; the 20-keto group in cortisone is reactive while in 21-esters of cortisone it is unreactive. This discovery thus permits mixtures of Δ$^{1,4}$-3-keto-steroids with saturated -3-keto-steroids and/or α:β-unsaturated-3-keto steroids to be separated readily. It may be mentioned that this discovery is quite surprising since we know of no other 3-keto-steroid which fails to give a Girard derivative and we can only assume that this is due to the influence of the two adjacent double bonds. The discovery is all the more surprising since, as stated above, Δ$^{4,6}$-3-keto-steroids do form Girard derivatives.

According to the present invention, therefore, there is provided a process for the preparation of Δ$^{1,4}$-3-keto-steroids containing no reactive carbonyl group, as hereinbefore defined, other than the 3-keto group, in which a mixture containing such steroids in admixture with other 3-keto, Δ$^1$-3-keto, Δ$^4$-3-keto and/or Δ$^{4,6}$-3-keto steroids is reacted with Girard reagent T or P in a solvent medium to form Girard derivatives with the other steroid or steroids and separating the desired Δ$^{1,4}$-3-keto-steroid from the reaction mixture.

Although the process according to the invention is capable of wide application, subject to the conditions herein laid down, it is particularly applicable to the preparation of Δ$^{1,4}$-3-keto-steroids of the general formula

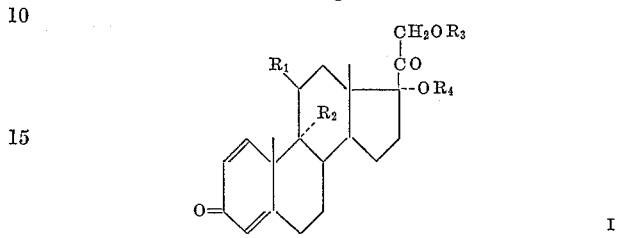

I where $R_1$ is an oxygen atom or a hydroxyl group, $R_2$ is a hydrogen or a halogen, particularly fluorine, atom, $R_3$ is an acyl group and $R_4$ is hydrogen or an acyl group. Preferred acyl groups are those derived from carboxylic acids, such as acetyl, propionyl, benzoyl or phenylacetyl groups. Examples of preferred compounds of this formula are esters of 1:2-dehydrocortisone and 1:2-dehydrocortisol, particularly the 21-acetates and 17:21-diacetates thereof.

The process according to the invention can be conveniently carried out by heating the initial mixture of steroids with Girard reagent P or T in a suitable solvent, for example a mixture of ethanol and acetic acid, and then effecting the separation of the Δ$^{1,4}$-3-keto-steroid in any desired manner. Since however the Girard derivatives formed are soluble in water they may be readily extracted from the resultant mixture since Δ$^{1,4}$-3-keto-steroids are insoluble in water. If the solvent used in the preparation of the derivatives is water-immiscible the Δ$^{1,4}$-3-keto-steroid will remain in the organic phase on the addition of water and may be readily recovered therefrom. If the solvent used in the preparation of the Girard derivatives is however water-miscible it is necessary to extract the Δ$^{1,4}$-3-keto-steroid with a water-immiscible solvent after the addition of water. In practice following the formation of the Girard derivatives it is convenient to add to the reaction mixture a dilute aqueous weak alkali such as aqueous sodium bicarbonate followed by extraction of the desired Δ$^{1,4}$-3-keto-steroid.

Suitable water-immiscible solvents for use in extraction are for example esters, such as ethyl acetate, and methylene dichloride.

The Δ$^{1,4}$-3-keto steroid may be recovered from the solvent medium by any convenient means such as distillation and thereafter purified by crystallisation, preceded if necessary by treatment with charcoal.

The invention is particularly applicable to the separation of steroid mixtures resulting from the dehydrobromination of 2:4-dibromo-3-keto-steroids, especially 2:4-dibromo-3-keto-5α-steroids.

A particularly convenient method for the dehydrobromination of 2:4-dibromo-3-keto-5α-steroids is by heating such steroids with semicarbazide base or its salts in substituted amides of the general formula R'.CO.NR''R''', where R' is a hydrogen atom or an aliphatic group having up to six carbon atoms and R'' and R''' are alkyl groups having from one to four carbon atoms or together form part of a heterocyclic ring.

It will of course be appreciated that the immediate product of this reaction contains the desired Δ$^{1,4}$-3-ketone in the form of its semicarbazone; this can of course be decomposed in any convenient way to yield the free ketone, for example by heating in an aqueous mixture of acetic and pyruvic acids for 1.5 hours.

By proceeding in this manner conversion to the corresponding $\Delta^{1:4}$-3-keto-steroid takes place smoothly and in good yield.

This method of dehydrobromination is particularly suitable for use in the treatment of steroids having a sensitive side-chain at $C_{17}$ and hence is very suitable for the conversion of 2:4-dibromo-4:5α-dihydrocortisone esters to 1:2-dehydrocortisone esters.

According to a feature of the invention, therefore, the starting material used in the separation process of the invention is obtained by heating a 2:4-dibromo-3-keto-5α-steroid with semicarbazide base or a salt thereof in, as reaction medium, a substituted amide of the formula R'.CO.NR''R''', where R' is a hydrogen atom or an aliphatic group having up to six carbon atoms and R'' and R''' are alkyl groups having from one to four carbon atoms or together form part of a heterocyclic ring, and decomposing the resultant semi-carbazone to yield the free ketone.

This method of dehydrobromination is particularly suitable for conversion of compounds of the general formula

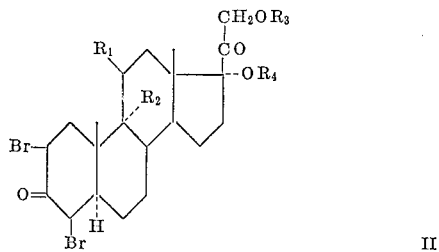

II where $R_1$, $R_2$, $R_3$ and $R_4$ have the meanings hereinbefore set forth to compounds of the general formula I hereinbefore set forth.

The substituted amides used as reaction media in the dehydrobromination process according to the invention particularly include dimethyl acetamide, N:N-dimethyl formamide, N:N-dimethyl valeramide, N:N-diethyl formamide, N:N-dipropylformamide and N:N-dibutylformamide, N-formylpiperidine and N-formylmorpholine. The semicarbazide may be used as the free base or as one of its salts such as the hydrochloride, sulphate or acetate.

The dehydrobromination may be carried out at temperatures within the range of 50–180° C., preferably between 80–100° C. We find that it is preferable to have present a small quantity of water, up to 5%, in the reaction medium as this tends to reduce side-chain degradation in the more sensitive compounds and to prevent dehydration of 17α-hydroxyl groups which occurs under anhydrous conditions. However 17α-acyloxy groups are not in general eliminated and the presence of water is not so essential when such groups are present; indeed since compounds of Formula II having the 17α-acyloxy groups are more stable than those having a free hydroxy group at $C_{17}$, the use of 17α-acyloxy compounds in general gives rise to better yields of the desired $\Delta^{1:4}$-3 ketones.

It may be found however that some deacylation at position 21 takes place during decomposition of the semi-carbazone and thus it is in general desirable to subject the reaction product from this decomposition to reacylation.

The time of dehydrobromination depends upon the concentration of the reactants, the temperature at which the reaction is carried out and the amount of water present (since there is a tendency for the reaction to become slower the more water is present). The course of the reaction may however conveniently be followed by removing aliquots from the reaction mixture and determining the intensity of absorption of the maximum in the ultra-violet absorption spectrum between 270 and 290 mμ (i.e. the characteristic maximum of the $\Delta^{1:4}$-3-semicarbazono-structure).

In order that the invention may be well understood the following examples are given by way of illustration.

*Example 1*

5.25 g. of a mixture of 3-keto-steroids, Girard P reagent (2 g.) ethanol (50 ml.) and acetic acid (5 ml.) were refluxed for 15 minutes, cooled and poured into aqueous sodium bicarbonate solution. Extraction with ethyl acetate followed by removal of the solvent under reduced pressure yielded 3.66 g., $$\lambda_{max.}^{EtOH} \; 238 \; m\mu, \; E_{1\,cm.}^{1\%} = 378$$

Two crystallisations from methanol furnished 1:2-dehydrocortisone acetate, M.P. 229–232° C., $[\alpha]_D = +191°$ (chloroform, c.=0.9), $= +187°$ (dioxan, c.=0.9);

$\lambda_{max.}^{EtOH} \; 238 \; m\mu; \; E_{1\,cm.}^{1\%} = 354; \; \gamma_{max.}^{CHBr_3} \; 1740$ and 1230 (21-acetate), 1725 (20-ketone), 1705 (ketone), 1656, 1620 and 1600 cm.$^{-1}$ ($\Delta^{1:4}$-3-ketone).

The mixture of steroids employed as starting material in this example was obtained in the following manner.

2:4-dibromo-4:5α-dihydrocortisone acetate (8 g.), semicarbazide hydrochloride (8 g.), water (8 ml.) and dimethyl-formamide (120 ml.) were maintained at 100° C. for 1.5 hours under an atmosphere of carbondioxide. (A sample was removed and poured into water. The resulting solid was filtered and dried and had $\lambda_{max.}^{EtOH} \; 287 \; m\mu, \; E_{1\,cm.}^{1\%} = 409, \; \lambda_{max.}^{EtOH} \; 243 \; m\mu, \; E_{1\,cm.}^{1\%} = 329$)

The solvent was reduced under vacuum and acetic acid (300 ml), water (140 ml.) and pyruvic acid (100%—30 ml.) was added and refluxed under an atmosphere of carbondioxide for 1.5 hours. Water was added and the product was extracted with methylene chloride, washed with aqueous sodium bicarbonate solution, dried and evaporated under reduced pressure (5.24 g.), $$\lambda_{max.}^{EtOH} \; 237 \; m\mu, \; E_{1\,cm.}^{1\%} = 339$$

This product was dissolved in pyridine and acetylated with acetic anhydride for 16 hours at room temperature. Water was added and the product extracted with methylene chloride, washed, dried and evaporated under reduced pressure to give crude 1:2-dehydrocortisone acetate (5.25 g.).

*Example 2*

A crude mixture obtained by dehydrobromination of 2:4 - dibromo - 4:5α - dihydrocortisone acetate (prepared from 4:5α-dihydrocortisone acetate; 25 g.) containing a mixture of 1:2-dehydrocortisone acetate, cortisone acetate, 4:5α-dihydrocortisone acetate and other impurities was refluxed for 30 minutes with Girard reagent T (11.2 g.) in alcohol (375 mls.) and glacial acetic acid (37.5 mls.). The cooled solution was poured into 4% aqueous sodium bicarbonate solution (2 l.) and ethyl acetate (750 ml.). The aqueous layer was further extracted with ethyl acetate (3×250 ml.). The first three combined extracts were washed with 4% aqueous sodium bicarbonate (500 ml.) and water (500 ml.) and the fourth extract used to re-extract these solutions. The combined extracts were dried over magnesium sulphate and simultaneously treated with charcoal (7.5 g.) for one hour. The filtered solution was evaporated to dryness. The residue was leached with boiling methanol (25 ml.), cooled at 0° C. overnight, filtered and washed with ether, to yield 1:2-dehydrocortisone acetate, 9.4 g., (37.8% based on 4:5α-dihydrocortisone acetate), M.P. 235–238° C., $$[\alpha]_D + 192°$$

(chloroform).

*Example 3*

A crude mixture obtained by the dehydrobromination of 2:4-dibromo-4:5α-cortisone-17:21-diacetate (prepared from 4:5α-dihydrocortisone acetate, 25 g.) and containing the analogous $\Delta^1$-3-keto-, $\Delta^4$-3-keto- and 3-keto-5α-steroids was heated under reflux for 0.5 hour with Girard reagent P (12.5 g.) in alcohol (375 ml.) and glacial acetic acid (37.5 ml.). The cooled solution was poured into 4% aqueous sodium bicarbonate solution (2 l.) and ethyl acetate (750 ml.). The aqueous layer was further extracted with ethyl acetate (3×250 ml.). The first three combined extracts were washed with 4% aqueous sodium bicarbonate (500 ml.) and water (500 ml.) and the fourth extract used to re-extract these solutions. The combined extracts were evaporated to dryness to yield crude 1:2-dehydrocortisone-17:21-diacetate (20.1 g.) which was redissolved in boiling ethyl acetate (400 ml.) and treated with charcoal (4 g.), filtered and evaporated to dryness. The residue was leached with boiling methanol (20 ml.), cooled at 0° C. overnight, filtered and washed with ether to yield, together with a second crop obtained by evaporation of the mother liquors, 14.7 g. light yellow brown crystals. This was redissolved in boiling methanol, treated with charcoal (3 g.). The filtered solution was evaporated to small bulk (ca. 50 ml.), cooled at 0° C. and the white crystals of pure 1:2-dehydrocortisone-17:21-diacetate collected by filtration, washed with ether and dried, 13.17 g. (48.3% based on 4:5α-dihydrocortisone acetate), M.P. 218–219° C., $[\alpha]_D+113.5°$ (1% in chloroform), $$\lambda_{max.}^{EtOH} \ 238 \ m\mu, \ E_{1 \ cm.}^{1\%} \ 345$$

Example 4

A crude mixture (3.1 g.) containing 1:2-dehydrocortisol acetate together with the corresponding $\Delta^{1\text{-}3}$-keto-, $\Delta^{4}$-3-keto- and 3-keto 5α-steroids was refluxed for twenty-five minutes in ethanol (50 ml.) and acetic acid (5 ml.) with Girard reagent P. The cooled solution was poured into a 4% solution of sodium bicarbonate in water (500 ml.), and the unreacted ketone extracted into ethyl acetate. The extract was washed twice with water and the combined aqueous layers re-extracted with ethyl acetate. Removal of solvent under reduced pressure from the dried extract gave a yellow solid residue (1.8 g.) M.P. 200–215° C., $$\lambda_{max.}^{EtOH} \ 243.5 \ m\mu, \ E_{1 \ cm.}^{1\%} \ 281$$

Further purification of this product by chromatography on magnesium trisilicate gave 1:2-dehydrocortisol acetate (790 mg.), M.P. 239–243° C. $[\alpha]_D+114°$ (c. 0.5 in dioxan)

$$\lambda \ max. \ 243.5 \ m\mu, \ E_{1 \ cm.}^{1\%} \ 360$$

Example 5

A crude mixture obtained by the dehydrobromination of 2:4-dibromo-cholestan-3-one (4.24 g.) was treated for 20 minutes with refluxing anhydrous ethanol (45 ml.) containing Girard P reagent (1.5 g.) and acetic acid (4.5 ml.). After cooling, the product was added to saturated aqueous sodium bicarbonate solution (250 ml.) and extracted thoroughly with ethyl acetate. The extract was washed, dried and evaporated to dryness (3.00 g.). Charcoal treatment and recrystallisation from methanol afforded $\Delta^{1.4}$-cholestadiene-3-one (2.35 g.) (78%). M.P. 112–13° C. $[\alpha]_D+27.5°$ (chloroform c. 1.05).

$$\lambda \ max. \ 245.5 \ m\mu, \ E_{1 \ cm.}^{1\%}=406$$

(Found C, 84.67%; H, 11.20%. $C_{27}H_{42}O$ requires C, 84.74%; H, 11.06%.)

Example 6

21-acetoxy-17α-hydroxy-2:4 - dibromo - 5α - pregnane-3:11:20-trione (4 g.) and semicarbazide base (2.2 g.) were heated in dimethyl acetamide (40 ml.) for 40 minutes at 100° C. The bulk of the solvent was then removed in vacuo and water (30 ml.), 90% pyruvic acid (6 ml.) and acetic acid (60 ml.) were added and the solution heated for 1.5 hours at 100° C. Dilution with water and extraction with methylene chloride gave a partially crystalline solid (1.92 g.) which was heated with ethanol (20 mls.), acetic acid (2 mls.) and Girard reagent P (1 g.) under reflux for 10 minutes. The solution was cooled, poured into aqueous sodium bicarbonate solution and extracted with methylene chloride. The extract was washed successively with aqueous sodium bicarbonate solution and water, dried over magnesium sulphate and evaporated to dryness under reduced pressure. In order to obtain analytically pure material the residue (1.08 g.) was dissolved in benzene and absorbed on to a column of alumina (40 g.). Elution with ether-chloroform gave 1:2-dehydrocortisone acetate (0.31 g.), identified by its infra-red spectrum.

Example 7

A solution of 2:4-dibromo-4:5α-dihydrocortisone-21-acetate (4.0 g.) and semicarbazide hydrochloride (3.2 g.) in dimethylacetamide containing 10% water (40 mls.) was heated for 10 minutes on a steam-bath. After the temperature had reached 90° C. the bulk of the solvent was removed under reduced pressure at 50–60° C. 90% pyruvic acid (6 mls.), glacial acetic acid (60 mls.) and water (30 mls.) were added and the solution heated on a steam-bath for 1.5 hours. The reaction mixture was cooled, diluted with water, extracted with methylene chloride, the extract washed successively with saturated sodium bicarbonate solution and water and dried with magnesium sulphate. The solvent was removed under reduced pressure; pyridine (20 mls.), acetic anhydride (10 mls.) added, and the solution allowed to stand at room temperature overnight. The crude product (2.93 g.) obtained by removal of the solvent under reduced pressure was refluxed with Girard reagent P (1.5 g.) in dry ethanol (2 mls.) and glacial acetic acid (2 mls.) for 10 minutes. The solution was cooled, poured into aqueous sodium bicarbonate solution and extracted with methylene chloride. The extract was washed with aqueous sodium bicarbonate solution and water, dried over magnesium sulphate and the solvent evaporated under reduced pressure. In order to obtain analytically pure material the residue (1.89 g.)

$$\lambda \ max. \ 238 \ m\mu, \ E_{1 \ cm.}^{1\%} \ 312$$

was dissolved in benzene and absorbed on to a column of alumina (60 g.). Elution by chloroform (500 mls.), removal of the solvent under reduced pressure and crystallisation of the residue from ethyl acetate gave 1:2-dehydrocortisone acetate (0.5 g.), M.P. 230–234° C.

$$\lambda_{max.}^{EtOH} \ 238.5 \ m\mu, \ E_{1 \ cm.}^{1\%} \ 349$$

Example 8

2:4 - dibromo - 4:5α - dihydrocortisone - 17:21 - diacetate (8 g.) and semicarbazide hydrochloride (8 g.) in dimethyl formamide (90 mls.) were heated on a steam-bath for 45 minutes. The bulk of the solvent was removed under reduced pressure, water (70 mls.), acetic acid (160 mls.) and pyruvic acid (26 mls., 50–60%) were added and the solution heated at 90° C. for 1.5 hours. The reaction mixture was cooled, diluted with water, extracted with methylene chloride, the extract washed and dried with magnesium sulphate. Evaporation of the solvent gave a crude product (5.86 g.)

$$\lambda \ max. \ 263 \ m\mu, \ E_{1 \ cm.}^{1\%} \ 333$$

which after reacetylation using acetic anhydride and pyridine was heated under reflux with ethanol (40 mls.), acetic acid (4 mls.) and Girard reagent P (2 g.) for 15 minutes. After cooling the solution was poured into aqueous sodium bicarbonate solution (350 mls.; 4%), extracted with ethyl acetate, the extract washed with water and dried over magnesium sulphate. Evaporation of the solvent under reduced pressure gave a crude product (3.11 g.)

$$\lambda \ max. \ 237 \ m\mu, \ E_{1 \ cm.}^{1\%} \ 311$$

which, in order to obtain analytically pure material, was dissolved in benzene and absorbed on to a column of a alumina. Elution with benzene and crystallisation of the product with methanol gave 1:2-dehydrocortisone-17:21-diacetate (1.23 g.), M.P. 212–213° C., $[\alpha]_D + 110°$ (chloroform, c.=1.2) $\lambda$ max. 238 m$\mu$, $E_{1\,cm.}^{1\%}$ 329

Further recrystallisation gave an analytically pure specimen, M.P. 213–214° C., $[\alpha]_D + 111°$ (chloroform, c.=1.0) $\lambda$ max. 238 m$\mu$, $E_{1\,cm.}^{1\%}$ 336

(Found: C, 67.66; H, 6.73; $C_{28}H_{30}O_7$ requires C, 67.85; H, 6.83%.)

We claim:
1. A process for the separation of a $\Delta^{1,4}$-3-keto steroid having the general formua

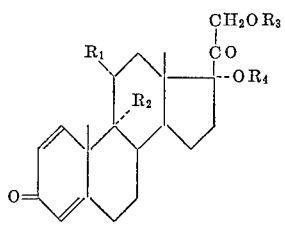

in which $R_1$ is a member selected from the group consisting of a keto group and a $\beta$-hydroxyl group, $R_2$ is a member selected from the group consisting of $\alpha$-hydrogen and $\alpha$-halogen atoms, $R_3$ is an acyl group derived from a carboxylic acid selected from the group consisting of lower alkanoic, benzoic and phenylacetic acids and $R_4$ is a member selected from the group consisting of a hydrogen atom, an acyl group derived from a lower alkanoic acid, a benzoyl group and a phenylacetyl group, from a mixture of said steroid with at least one other steroid selected from the group consisting of the 3-keto, $\Delta^1$-3-keto, $\Delta^4$-3-keto and $\Delta^{4,6}$-3-keto steroids corresponding to said $\Delta^{1,4}$-3-keto steroid, which process comprises reacting said mixture of steroids with a reagent selected from the group consisting of Girard reagent T and Girard reagent P in an inert solvent medium to form a Girard derivative with said other steroid while leaving said $\Delta^{1,4}$-3-keto steroid unreacted and separating the desired $\Delta^{1,4}$-3-keto steroid from the reaction mixture.

2. The process of claim 1 in which said $\Delta^{1,4}$-3-keto steroid is the acetate of a steroid selected from the group consisting of 1:2-dehydrocortisone and 1:2-dehydrocortisol.

3. The process of claim 1 in which said solvent medium is a mixture of ethanol and acetic acid.

4. The process of claim 1 in which said $\Delta^{1,4}$-3-keto steroid is separated from the reaction mixture by adding an aqueous medium to said mixture while maintaining said reaction mixture at a pH of at least 7 and extracting said $\Delta^{1,4}$-3-keto steroid from the mixture with an inert water-immiscible organic solvent.

5. The process of claim 4 in which said water immiscible organic solvent is selected from the group consisting of ethyl acetate and methylene dichloride.

6. A process for separating a mixture of a $\Delta^4$-3-keto-pregnene compound and a $\Delta^{1,4}$-3-keto-pregnadiene compound into its components which comprises reacting said mixture with a reagent selected from the group consisting of Girard reagent T and Girard reagent P in an inert solvent medium to form a Girard derivative of said $\Delta^4$-3-keto-pregnene compound and separating said $\Delta^{1,4}$-3-keto-pregnadiene compound from the mixture.

References Cited in the file of this patent
UNITED STATES PATENTS

| | | |
|---|---|---|
| 2,579,479 | Djerassi | Dec. 25, 1951 |
| 2,694,079 | Holysz | Nov. 9, 1954 |
| 2,708,673 | Levin | May 17, 1955 |
| 2,735,855 | Djerassi | Feb. 21, 1956 |
| 2,749,356 | Velluz | June 5, 1956 |
| 2,768,191 | Warnant | Oct. 23, 1956 |
| 2,769,020 | Hershberg | Oct. 30, 1956 |
| 2,773,076 | Reichstein | Dec. 4, 1956 |
| 2,814,630 | Walker et al. | Nov. 26, 1957 |
| 2,837,541 | Hirschmann | June 3, 1958 |

OTHER REFERENCES

Reichstein: Helv. Chim. Acta, 19, 1107 (1936).
Wendler: J.A.C.S., 73, 3818–3820 (1951).
Fieser: Natural Products Related to Phenanthrene, 1949, page 308.